US012758938B2

(12) United States Patent
Beyer et al.

(10) Patent No.: US 12,758,938 B2
(45) Date of Patent: Oct. 13, 2026

(54) HYDROGEN PRODUCTION FACILITY HAVING EQUIPMENT WITH A NITRIDATION PROTECTIVE LAYER

(71) Applicant: L'Air Liquide, Societe Anonyme pour l'Etude et l'Exploitation des Procedes Georges Claude, Paris (FR)

(72) Inventors: Christoph Beyer, Frankfurt am Main (DE); Robert Breining, Frankfurt am Main (DE); Dieter Ulber, Frankfurt am Main (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 1085 days.

(21) Appl. No.: 17/896,029

(22) Filed: Aug. 25, 2022

(65) Prior Publication Data

US 2024/0066493 A1 Feb. 29, 2024

(51) Int. Cl.
*B01J 8/06* (2006.01)
*B01J 19/02* (2006.01)
*C01B 3/047* (2026.01)

(52) U.S. Cl.
CPC ............... *B01J 19/02* (2013.01); *C01B 3/047* (2013.01); *B01J 2219/00024* (2013.01); *B01J 2219/029* (2013.01); *C01B 2203/0227* (2013.01)

(58) Field of Classification Search
CPC .............. B01J 19/02; B01J 2219/00024; B01J 2219/029; B01J 8/062; B01J 2219/02; B01J 7/00; B01J 2219/00157; C01B 3/047; C01B 2203/0227; C01B 3/384
USPC .......................................................... 422/198
See application file for complete search history.

(56) References Cited

U.S. PATENT DOCUMENTS 4,401,153 A 8/1983 Marsch et al.
6,720,088 B2 * 4/2004 Zhao ...................... C23C 10/30 428/668
2005/0100693 A1 5/2005 Chellappa et al.
2005/0233599 A1 10/2005 Sugawara et al.
2008/0005965 A1 1/2008 Speranza
2015/0099876 A1 4/2015 Academia et al.
2015/0211309 A1 7/2015 Davis et al.
(Continued)

FOREIGN PATENT DOCUMENTS

JP 2020196646 A * 12/2020
WO WO-9530779 A1 * 11/1995 ............ C23C 10/50

OTHER PUBLICATIONS

JP-2020196646A—translation (Year: 2025).*
International Search Report and Written Opinion for PCT/US2022/041910, mailed Dec. 30, 2022.

*Primary Examiner* — Huy Tram Nguyen
(74) *Attorney, Agent, or Firm* — Justin K. Murray

(57) ABSTRACT

A hydrogen production facility having equipment with a nitridation protective layer is provided. The hydrogen production facility can include a reformer configured to catalytically convert a feed stream into a product stream comprising hydrogen, the reformer having a plurality of catalyst tubes and a plurality of burners configured to provide heat to the catalyst tubes; means for providing the feed stream to the reformer from an ammonia source, wherein the feed stream comprises at least 90% of ammonia, wherein the plurality of catalyst tubes comprise a nitridation protective layer on an inner surface of the catalyst tubes.

13 Claims, 3 Drawing Sheets

(56) References Cited

U.S. PATENT DOCUMENTS

| | | | |
|---|---|---|---|
| 2018/0178188 | A1 | 6/2018 | Brown et al. |
| 2018/0230009 | A1* | 8/2018 | Bedu-Amissah .......... B01J 8/06 |
| 2019/0084831 | A1 | 3/2019 | Andersen et al. |

* cited by examiner

HYDROGEN PRODUCTION FACILITY HAVING EQUIPMENT WITH A NITRIDATION PROTECTIVE LAYER

TECHNICAL FIELD OF THE INVENTION

The present invention relates to an apparatus and method for hydrogen production using existing industrial units. More specifically, embodiments of the present invention are related to avoiding embrittlement of steels caused by nitridation.

BACKGROUND OF THE INVENTION

In an effort to reduce the effects of carbon dioxide emissions, new energy carriers are becoming increasingly more important. One of the leading energy carriers is hydrogen; however, due to its small molecular size, high-pressure requirements, and very low boiling point, transportation of elemental hydrogen is difficult and costly.

Ammonia ($NH_3$) has raised some attention in the literature, since existing infrastructure can be used for storage and transportation (e.g., LPG infrastructure). As such, production of hydrogen using ammonia, instead of natural gas, to produce hydrogen is foreseen to be the future of the next generation of hydrogen production. Unfortunately, new industrial facilities are quite costly to build and take many years to design and produce. Therefore, it will likely be at least a decade or more before any new dedicated ammonia cracking facilities can be operational. In the interim, it is still desirable to proceed with production of hydrogen in a more environmentally sensitive manner, which includes the cracking of ammonia gas by using existing hydrogen production facilities.

Ammonia can be cracked into hydrogen and nitrogen at ambient pressure and moderate temperatures (450-600° C.) by thermal cracking and/or in the presence of a catalyst. In order to save hydrogen compression energy on the backend, it can be advantageous to apply higher pressures for the $NH_3$ cracking reaction (it is easier to compress ammonia gas compared to hydrogen gas due to hydrogen's small molecular size). However, at higher pressures, the cracking reaction is not favored according to Le Chateher's principle, so higher temperatures are favored (around 700° C.) in order to reach economic conversion rates.

Unfortunately, ammonia is known to lead to nitride formation (nitridation) in steels during the process of $NH_3$ cracking into $H_2$ and $N_2$, particularly so at elevated temperatures. This is because the ammonia cracking reaction at elevated temperature will lead to formation of atomic nitrogen, which diffuses into the metallic material to form nitrides, thereby causing the embrittlement of steels.

As some steels also act as catalysts for the $NH_3$ cracking process, nitride formation of steel can occur already at its surface and at temperatures where only small ammonia conversion rates are observed. That means steels might already be at risk of embrittlement during heat up of ammonia to above 400° C.

Currently steam methane reformers (SMRs) are operated with hydrocarbon feedstock, such as natural gas, LPG, naphtha, refinery off gas or the like, at temperatures well above 700° C. Although natural gas typically contains nitrogen, this molecular nitrogen does not lead to critical nitride formation in steels from the process (tube) side, as the partial pressure of nitrogen is not high enough and catalysts to split $N_2$ into atomic nitrogen are not present. As such, existing SMRs are not designed with this contingency in mind.

Current materials applied in the feed pretreatment and preheating section of an SMR plant are carbon steel (CS), chromium-molybdenum low alloy steels (CrMo), and stainless steel (SS). In short, of the applied steels, especially iron, but also important alloying elements like chromium, can easily form nitrides. Furthermore, the majority of process equipment in a syngas generation unit is operated well above 400° C. Therefore, it is not feasible to simply switch the feedstock from hydrocarbons to ammonia for an existing hydrogen production facility.

As such, there is a need in the art to provide industrial facilities that can efficiently produce hydrogen from ammonia, particularly by retrofitting existing hydrogen production industrial facilities to produce hydrogen from an ammonia feed gas while preventing, delaying, or at least minimizing embrittlement issues during operation.

SUMMARY OF THE INVENTION

The present invention is directed to an apparatus and process that satisfies at least one of these needs. In certain embodiments of the invention, a protective liner is applied in a common catalyst tube. In a second embodiment, the invention can include application of an aluminization layer on the inner tube surface. In a third embodiment that addresses resistance against nitridation at very high temperatures (e.g., above about 700° C.), a diffusion barrier can be applied between the aluminization layer and the tube material to limit diffusion between the aluminization layer and the tube material. This diffusion barrier is preferably configured to block, or at least minimize, any interaction between the substrate (i.e., aluminization layer) and the environment. In a fourth embodiment, a weld-overlay can be applied to the inner surface of the catalyst tube.

In one embodiment, the method for converting an existing steam methane reformer (SMR) to produce hydrogen via ammonia cracking by adding a protective layer to an inner surface of equipment to be used in the existing SMR can include the steps of: providing the existing SMR, wherein the SMR was formerly used to produce hydrogen from a hydrocarbon feedstock; and improving the nitridation resistance of the inner surface of the equipment, wherein the equipment is selected from the group consisting of a catalyst tube, feed piping, a feed preheater, process gas heat exchangers, and combination thereof.

In optional embodiments of the method:

- the step of improving the nitridation resistance includes a process selected from the group consisting of applying a protective liner material that is mechanically coupled to the inner surface, applying an aluminization layer to the inner surface, applying a diffusion barrier layer in conjunction with the aluminization layer, wherein the diffusion barrier layer is disposed between the inner surface and the aluminization layer, and applying a weld-overlay to the inner surface;
- the step of improving the nitridation resistance comprises applying an aluminization layer to the inner surface;
- the step of applying the aluminization layer comprises the steps of: introducing an aluminization source powder into an internal space delimited by the inner surface of the equipment through an inlet, the inner surface of the equipment comprising a base metal; transferring aluminum from the aluminization source powder to the inner surface of the equipment by heating said equipment and allowing the aluminum to diffuse and react with elements in the base metal to form an aluminide layer; and removing the aluminization source powder from the internal space;

the step of applying the aluminization layer comprises the steps of: depositing an aluminization slurry layer on the inner surface of the equipment through an inlet, the inner surface of the equipment comprising a base metal; drying the slurry layer; transferring aluminum from the aluminization slurry to the inner surface of the equipment by heating said equipment and allowing the aluminum to diffuse and react with elements in the base metal to form an aluminide layer; and removing the remains of the aluminization slurry from the internal space;

the step of improving the nitridation resistance comprises applying a diffusion barrier layer to the inner surface of the piece of equipment, and applying an aluminization layer to the diffusion barrier layer, such that the diffusion barrier layer is disposed between the inner surface of the piece of equipment and the aluminization layer;

the diffusion barrier layer comprises a chrome-silicon barrier layer;

the step of improving the nitridation resistance comprises applying a protective liner that is mechanically coupled to the inner surface;

the protective liner material is selected from a group of alloys having a nickel content in excess of 60%;

the protective liner is coupled to the inner surface via at only one end thereby reducing potential damage during thermal expansion;

the protective liner is coupled to the inner surface of the equipment via a flange or welding;

the protective liner is configured to have a substantially similar thermal expansion coefficient to that of the piece of equipment;

the step of improving the nitridation resistance comprises applying a protective weld-overlay to the inner surface;

the protective weld-overlay is selected from a group of alloys having a nickel content in excess of 60%; and/or the equipment that has improved nitridation resistance is a new piece of equipment or was previously used in the existing SMR.

In another embodiment, the method can include the steps of: A method for adding a protective layer to equipment to be used in an existing hydrogen industrial unit, the method comprising the steps of: providing the existing hydrogen industrial unit, wherein the hydrogen industrial unit was formerly used to produce hydrogen from a hydrocarbon feedstock; and improving the nitridation resistance of an inner surface of the equipment, wherein the equipment that has improved nitridation resistance is a new piece of equipment or was previously used in the existing hydrogen industrial unit.

In optional embodiments of the method:

the equipment is selected from the group consisting of feed preheaters, feed piping, catalyst tubes, process gas heat exchangers, outlet system, process gas boiler, and combinations thereof; and/or the protective layer is applied to equipment that is configured to be in fluid communication with an ammonia feed gas at temperatures exceeding 400° C.

In another embodiment, a hydrogen production facility is provided and can include: a reformer configured to catalytically convert a feed stream into a product stream comprising hydrogen, the reformer having a plurality of catalyst tubes and a plurality of burners configured to provide heat to the catalyst tubes; means for providing the feed stream to the reformer from an ammonia source, wherein the feed stream comprises at least 90% of ammonia, wherein the plurality of catalyst tubes comprise a nitridation protective layer on an inner surface of the catalyst tubes.

In optional embodiments of the apparatus:

the nitridation protective layer is selected from the group consisting of a protective liner material that is mechanically coupled to the inner surface, an aluminization layer applied to the inner surface, a diffusion barrier layer in conjunction with the aluminization layer applied to the inner surface, wherein the diffusion barrier layer is disposed between the inner surface and the aluminization layer, and a weld-overlay applied to the inner surface;

the nitridation protective layer comprises the diffusion barrier layer in conjunction with the aluminization layer applied to the inner surface;

the diffusion barrier layer comprises a chrome-silicon barrier layer;

the nitridation protective layer comprises applying a protective liner that is mechanically coupled to the inner surface;

the protective liner material is selected from a group of alloys having a nickel content in excess of 60%;

the protective liner is coupled to the inner surface via at only one end thereby reducing potential damage during thermal expansion;

the protective liner is coupled to the inner surface of the equipment via a flange or welding;

the protective liner is configured to have a substantially similar thermal expansion coefficient to that of the piece of equipment;

the nitridation protective layer comprises a protective weld-overlay applied to the inner surface;

the protective weld-overlay is selected from a group of alloys having a nickel content in excess of 60%;

the hydrogen production facility was formerly used to catalytically crack hydrocarbons in the presence of steam to produce hydrogen; and/or the hydrogen production facility can also include additional equipment having the nitridation protective layer, wherein the additional equipment is selected from the group consisting of feed piping, a feed preheater, process gas heat exchangers, and combination thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages, will be better understood from the following description when considered in connection with the accompanying figures. It is to be expressly understood, however, that the figures are provided for the purpose of illustration and description only and are not intended as a definition of the limits of the present invention.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
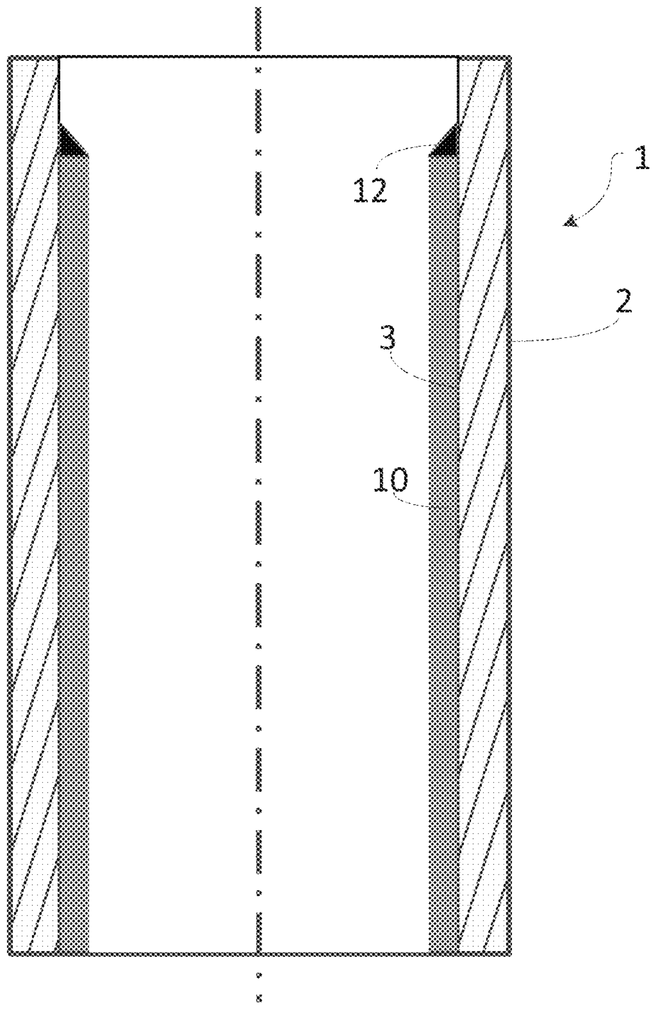
FIG. 1 shows an embodiment of a cross-sectional view of a catalyst tube in conformance with a first embodiment of the present invention having a welded or flanged liner.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

As used herein, "aluminization layer" is intended to cover a diffusion layer that includes a mixture of iron and nickel aluminides (e.g., FeAl, NiAl) with a preferred aluminum content of between 25-40 wt %.

While the current disclosure focuses on the protection of catalyst tubes, Applicants note that the inventive idea does not need to be restricted to its application in catalyst tubes only. It can also be used in some of the upstream equipment, if needed, for example in the feed superheating coils, heat exchangers, and connecting piping. This will be highly preferable, if the tie-in point is shifted further upstream in the process, for whatever reason, e.g., preheating of ammonia and heat integration of the flue gas and splitting of $NH_3$ starting prior to entering the catalyst tubes due to temperature and a certain catalytic effect of metallic surfaces.

Formation of nitrides from elemental nickel is not documented in literature. The beneficial effects of reducing the nitridation susceptibility using nickel in steels include lower solubility of nitrogen and lower diffusion rates of nitrogen in alloys with nickel content up to 40 wt. %. However, some high content nickel base alloys are known to better withstand nitride formation and embrittlement as the aforementioned. One such candidate is Alloy 600. The currently used high-temperature, high-creep-strength catalyst tube material does not belong to these materials. Hence, the task is to optimize the material for the selection for the inner diameter surface of the catalyst tubes that are potentially affected by nitridation—either by replacing them with tubes made from another material or to coat/weld-overlay or line the inner diameter surface of the catalyst tube with a material having a lower nitridation embrittlement susceptibility.

Catalyst tubes have to be resistant not only against the inner process conditions but also against the outer high temperature flue gas atmosphere while providing sufficient creep strength, which materials with high nitridation resistance typically do not possess. Therefore, certain embodiments of the present invention concentrate on improving the nitridation resistance on the inside of the common catalyst tubes by applying an appropriate selection of a resistant material. The resistant material can be a very thin layer applied on the material surface, a combination of layers, or a thicker lining or weld-overlay. The resistant material can also be chosen in combination with an oxidizing process medium in such a manner that, due to a more oxidizing atmosphere, the material forms a protective oxide layer upon exposure to the ammonia and oxidizing agent mixture.

In certain embodiments, the liner material can be selected to be nickel or an alloy with a very high nickel content (Nickel content similar or higher than in alloy 600, i.e. Ni>60%). FIG. 1 provides a cross sectional view of a catalyst tube 1 having an outer wall 2 in accordance with these embodiments. In the embodiment shown, the liner 10 can be flanged to the inlet or welded 12 to the inner wall 3 of the catalyst tube 1. In these embodiments, either the protective liner 10 can be attached to the inner wall 3 of the catalyst tube only at one side (inlet), so that the different thermal expansion coefficients of the materials will not lead to damage of the liner 10 or the catalyst tube itself, or the material composition of the liner 10 is chosen such, that its thermal expansion coefficient is substantially similar to that of the catalyst tube 1. The latter solution would also allow the use of a material with non-optimal resistance against nitridation, but with the intention to replace it after reaching an appropriate lifetime. As used herein, an expansion coefficient that is "substantially similar" means that the expansion coefficients are the same+/−5%, or close enough that differences in thermal expansion do not cause problems in production or result in safety issues.

Figure 2:
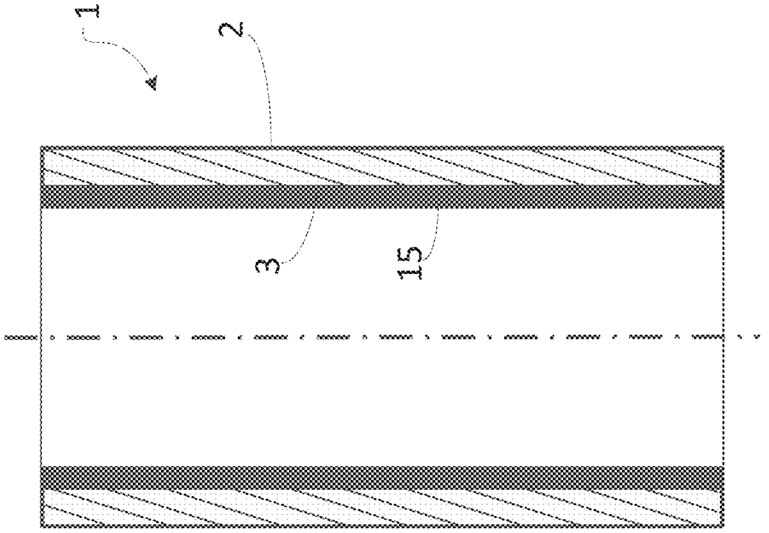
FIG. 2 shows an embodiment of a cross-sectional view of a catalyst tube in conformance with a second embodiment of the present invention having an aluminization layer without a diffusion barrier layer.

FIG. 2 provides another embodiment of the invention, which can include application of an aluminization layer 15 on the inner wall 3 (e.g., inner surface). Although an aluminum-containing alloy with only some percent aluminum is known to be very susceptible to nitridation because aluminum is a strong nitride former, at very high aluminum content, as it is the case in such a coating, a protective oxide layer will form at the surface, even in atmospheres with low oxygen partial pressure. The coating process could be, but is not limited to, aluminization by pack cementation.

In certain embodiments using pack cementation, a conversion layer with high aluminide (e.g., $Ni_3Al$) content with a controlled thickness can be achieved.

The steps for providing the aluminization layer to an article having an internal cavity for protection against embrittlement can include introducing an aluminization source powder into the internal cavity through an inlet; heating the article with the aluminization source powder in the internal cavity to cause aluminum to transport from the aluminization source powder to the internal surface of the internal cavity; and thereafter removing the aluminization source powder from the internal cavity through the inlet.

Figure 3:
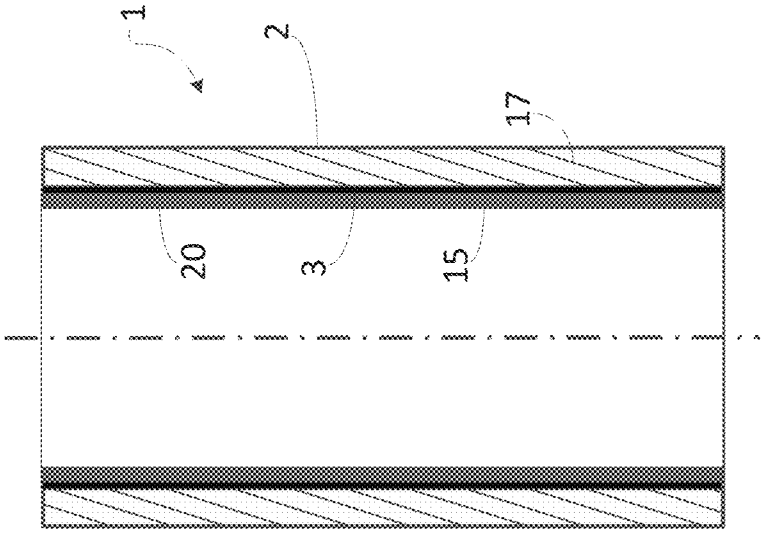
FIG. 3 shows an embodiment of a cross-sectional view of a catalyst tube in conformance with a third embodiment of the present invention having an aluminization layer with a diffusion barrier layer between the aluminization layer and the base material.

FIG. 3 provides a similar solution to that shown in FIG. 2; however, in this embodiment, very high temperatures (e.g. above about 700° C.) might introduce diffusion processes between the base material 17 of the catalyst tube 1 and the aluminization layer 15, which might affect the protective effect of the coating itself. Therefore, in addition to the aluminization layer 15, by modification of the aluminization process, another layer is disposed between the aluminization layer 15 and the tube material 17 and works as a diffusion barrier 20. This additional barrier layer can be, as a non-limiting example, a chrome-silicon barrier layer.

As illustrated in FIGS. 2 and 3, one solution of the present invention is a catalyst tube 1 comprising: an external wall 2, an internal wall 3, an aluminization layer 15 mirroring at least a portion of the internal wall, a diffusion barrier 20 mirroring at least a portion of the internal wall, wherein the diffusion barrier 20 is between the internal wall 3 and the aluminization layer 15.

As the case may be, the catalyst tube according to the present invention can exhibit one or more of the following characteristics: the diffusion barrier 20 matches the shape of the internal wall 3 and the shape of the aluminization layer 15; the diffusion barrier 20 can be a chrome-silicon barrier layer disposed between the tube material 17 and the aluminization layer 15.

Preferably, the diffusion barrier fits the shape of the internal wall of the tube. The diffusion barrier must be selected as a function of its ability to withstand operating conditions at high temperature (700 to 1000° C.)

Figure 4:
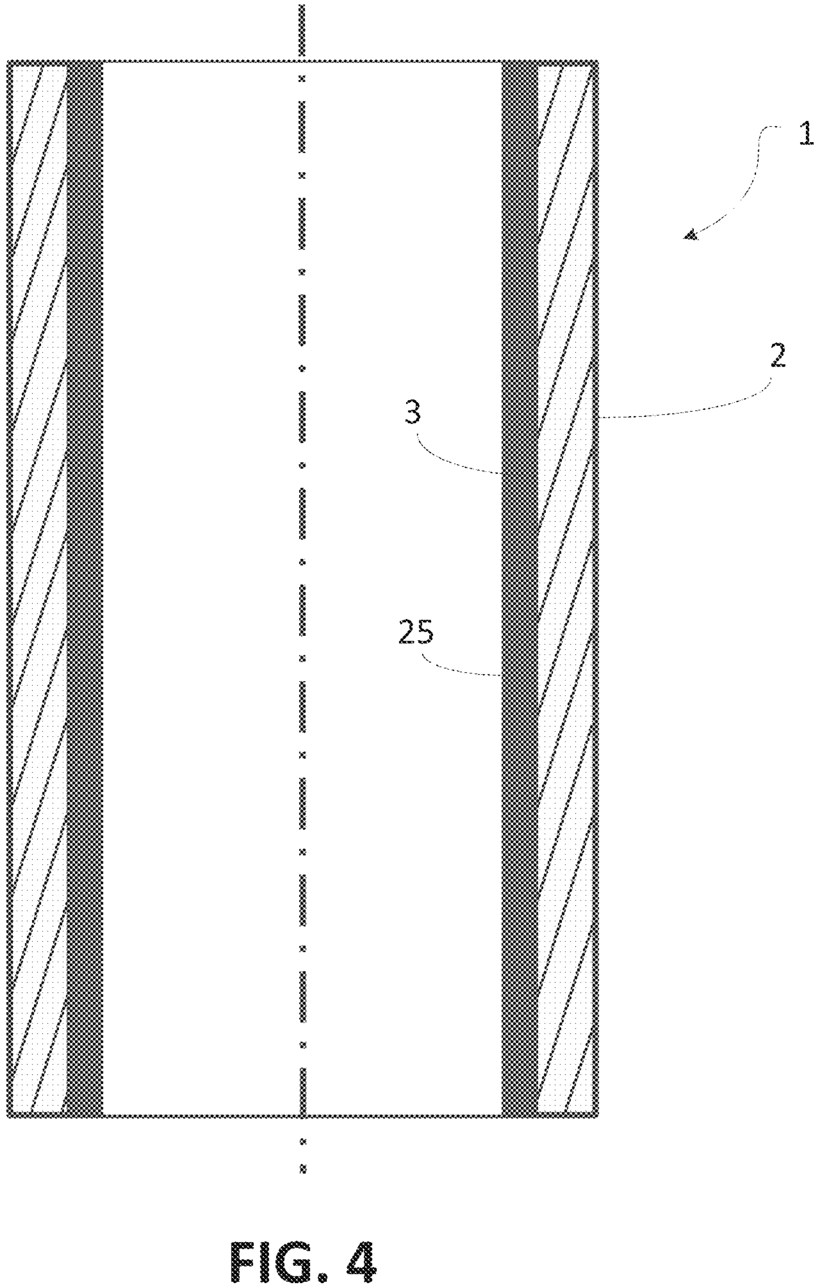
FIG. 4 shows an embodiment of a cross-sectional view of a catalyst tube in conformance with a fourth embodiment of the present invention having a weld-overlay.

FIG. 4 provides yet another embodiment, in which resistance to nitridation can be achieved by adding a resistant weld-overlay 25 to the inner wall 3 of components in contact with ammonia and ammonia-cracking products. A few non-limiting examples can include catalyst tubes, piping, heat coil, heat exchanger tube, etc. . . . . This resistant material can include a nickel-base alloy with a minimum 60% nickel, and forms a barrier between the tube side medium and the internal metallic tube wall. This weld-overlay is a type of cladding, where the high nickel metal is added to the surface of the inner tube wall by melting a weld consumable and depositing it in one or more welding passes. Contrary to a solid liner material, the final closed surface of a weld-overlay is built up by overlapping single weld beads into a closed, protective surface While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps or devices can be combined into a single step/device.

The singular forms “a”, “an”, and “the” include plural referents, unless the context clearly dictates otherwise. The terms about/approximately a particular value include that particular value plus or minus 10%, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. A hydrogen production facility comprising:

a reformer configured to catalytically convert a feed stream into a product stream comprising hydrogen, the reformer having a plurality of catalyst tubes and a plurality of burners configured to provide heat to the catalyst tubes;

a reformer configured to catalytically convert a feed stream into a product stream comprising hydrogen, the reformer having a plurality of catalyst tubes and a plurality of burners configured to provide heat to the catalyst tubes; and means for providing the feed stream to the reformer from an ammonia source, wherein the feed stream comprises at least 90% of ammonia, wherein the plurality of catalyst tubes comprise a nitridation protective layer on an inner surface of the catalyst tubes, wherein the nitridation protective layer comprises a diffusion barrier layer in conjunction with an aluminization layer applied to the inner surface.

2. The hydrogen production facility as claimed in claim 1, wherein the diffusion barrier layer comprises a chrome-silicon barrier layer.

3. The hydrogen production facility as claimed in claim 1, wherein the hydrogen production facility was formerly used to catalytically crack hydrocarbons in the presence of steam to produce hydrogen.

4. The hydrogen production facility as claimed in claim 1, further comprising additional equipment having the nitridation protective layer, wherein the additional equipment is selected from the group consisting of feed piping, a feed preheater, process gas heat exchangers, and combination thereof.

5. The hydrogen production facility as claimed in claim 1, wherein the reformer is configured to maintain a reducing atmosphere within the plurality of catalyst tubes, the reducing atmosphere being characterized by an oxygen partial pressure insufficient to form a protective oxide scale on the inner surface of the catalyst tubes.

6. The hydrogen production facility as claimed in claim 1, wherein the nitridation protective layer is configured to limit the diffusion of atomic nitrogen into the base metal of the catalyst tubes at temperatures between 700° C. and 1000° C.

7. The hydrogen production facility as claimed in claim 1, wherein the diffusion barrier layer comprises a chrome-silicon layer configured to impede metallurgical interaction between the aluminization layer and the base metal of the catalyst tube.

8. The hydrogen production facility as claimed in claim 1, wherein the plurality of catalyst tubes are configured for continuous industrial-scale cracking of an ammonia feed at a pressure significantly above ambient pressure.

9. A hydrogen production facility comprising:

a reformer configured to catalytically convert a feed stream into a product stream comprising hydrogen, the reformer having a plurality of catalyst tubes and a plurality of burners configured to provide heat to the catalyst tubes;

a reformer configured to catalytically convert a feed stream into a product stream comprising hydrogen, the reformer having a plurality of catalyst tubes and a plurality of burners configured to provide heat to the catalyst tubes; and means for providing the feed stream to the reformer from an ammonia source, wherein the feed stream comprises at least 90% of ammonia, wherein the plurality of catalyst tubes comprise a nitridation protective layer on an inner surface of the catalyst tubes, wherein the nitridation protective layer comprises a protective liner that is mechanically coupled to the inner surface, wherein the protective liner material is selected from a group of alloys having a nickel content in excess of 60%.

10. The hydrogen production facility as claimed in claim 9, wherein the protective liner is coupled to the inner surface via at only one end thereby reducing potential damage during thermal expansion.

11. The hydrogen production facility as claimed in claim 9, wherein the protective liner is coupled to the inner surface of the equipment via a flange or welding.

12. The hydrogen production facility as claimed in claim 9, wherein the protective liner is configured to have a substantially similar thermal expansion coefficient to that of the piece of equipment.

13. A hydrogen production facility comprising:

a reformer configured to catalytically convert a feed stream into a product stream comprising hydrogen, the reformer having a plurality of catalyst tubes and a plurality of burners configured to provide heat to the catalyst tubes;

a reformer configured to catalytically convert a feed stream into a product stream comprising hydrogen, the reformer having a plurality of catalyst tubes and a plurality of burners configured to provide heat to the catalyst tubes; and means for providing the feed stream to the reformer from an ammonia source, wherein the feed stream comprises at least 90% of ammonia, wherein the plurality of catalyst tubes comprise a nitridation protective layer on an inner surface of the catalyst tubes, wherein the nitridation protective layer comprises a protective weld overlay applied to the inner surface, wherein the protective weld-overlay is selected from a group of alloys having a nickel content in excess of 60%.

* * * * *